March 22, 1960  J. LAUTENBACHER  2,929,297
TELEPHOTO OBJECTIVE
Filed June 11, 1958
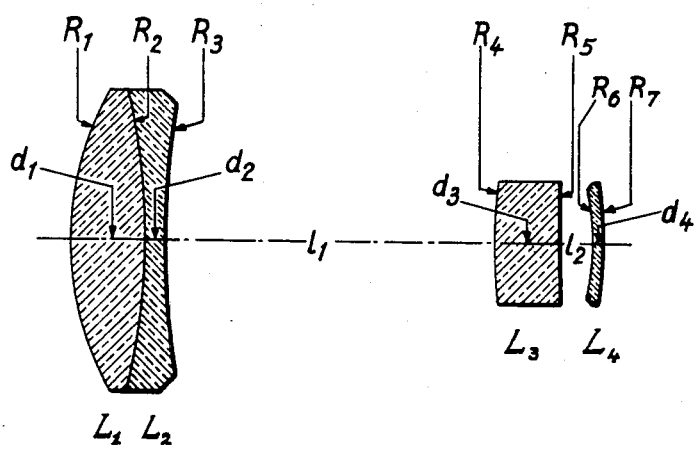
INVENTOR:
JOHANN LAUTENBACHER
by
Mastern & Kollin
ATTORNEYS

United States Patent Office 2,929,297
Patented Mar. 22, 1960

2,929,297

TELEPHOTO OBJECTIVE

Johann Lautenbacher, Munich, Germany, assignor to Enna-Werk Optische Anstalt Dr. Appelt K.G., Munich, Germany Application June 11, 1958, Serial No. 741,415

1 Claim. (Cl. 88—57)

The subject of the present invention is a telephoto objective which comprises a meniscus-shaped front part of positive power of refraction which consists of a bi-convex and a bi-concave lens element, said bi-convex lens element functioning as the outer lens element directed towards the side of the object; and another part of a negative refractive power separated by a large air space, said other part including a positive lens element and a negative meniscus element positioned closer to the image plane, its convex side being turned towards the object to be photographed.

Lenses of such construction are already known. In order to employ these successfully in cameras with a sector shutter between the film plane and the apex of the last lens element, it is necessary to improve them considerably. Above all, such improvement is imperative in order to meet the requirements in cameras of this type with regard to good distribution of light in the image field, which is an absolute prerequisite for color photography.

According to the present invention, vignetting can be eliminated to such an extent that even with the shortest exposure time, the smallest aperture, the shortest distance, and therefore under most extreme conditions, the reduction of light remains within permissible limits.

This becomes possible when, on the one hand, the exit pupil lies as far back as possible, and on the other hand the distance between the back lens and the image, i.e. the distance between the last lens element apex and the picture plane is so slight that the apex of the last element may be set as near as possible to the shutter segments.

Both of these requirements may be met, even when only four lens elements are employed, when the structural conditions listed below can be fulfilled.

The focal length of the meniscus-shaped positive front element part $L_1$, $L_2$ must be between 0.75 and the full focal length of the entire system $f_g$; the focal length of the positive lens element (in the negative part) $L_3$ must be between 0.9 and 1.5 times the focal length of the entire system ($f_g$).

(1) $f_g > f(L1+L2) > 0.75 f_g$ (2) $0.9 f_g < f_3 < 1.5 f_g$

The relationship of the thickness of the third lens element $d_3$ to the air space $l_2$, between this negative lens element part $L_3$ and the negative meniscus element $L_4$ must be such, that the glass path for a penetrating light ray is always greater than the air path, with the glass path not exceeding, however, the air path by more than 30 times, or (3) $30 l_2 > d_3 > l_2$ It is further of advantage that the radius of the cemented surface $R_2$, between the two lens elements $L_1$ and $L_2$ of the front element part be not curved more than 0.55 tims the focal length of the entire lens system $f_g$; and that at the same time the difference between the Abbé numbers of lens element L1 and lens element L2 ($V_1-V_2$) should be kept smaller than 20.0.

(4) $R_2 > 0.55 f_g$ (5) $(v_1-v_2) < 20.0$

In the drawing, there is given an example of an embodiment of such an objective according to the invention which corresponds to a tele-objective with the data given in the following table. The curvature radii are indicated by R, the lens element thicknesses by $d$, the air spaces by $l$, the type of glass by $n$ and the Abbé numbers by $v$.

[Aperture relationship: 1:3.5   Focal length: 100 mm.]

| | | | |
|---|---|---|---|
| $R_1=+29.6$ | $d_1=7.5$ | $n_1=1.605602$ | $v_1=43.9$ |
| $R_2=-63.0$ | $d_2=2.0$ | $n_2=1.76182$ | $v_2=26.5$ |
| $R_3=+102.0$ | $l_1=32.8$ | | |
| $R_4=+43.0$ | $d_3=7.0$ | $n_3=1.62041$ | $v_3=60.3$ |
| $R_5=+144.0$ | $l_2=2.6$ | | |
| $R_6=-21.6$ | $d_4=1.0$ | $n_4=1.51821$ | $v_4=59.0$ |
| $R_7=-97.7$ | | | |

It is definitely within the scope of the invention to leave the two lens elements 1 and 2 of the front part uncemented, i.e. to separate them from one another by a small air space, in which case the lens element surfaces facing each other may have small differences of curvature.

What I claim is:

A telephoto lens for use in photography comprising, a meniscus-shaped front part of positive refraction power, said front part consisting of a biconvex lens element and a biconcave lens element, said biconvex lens forming an outer lens element directed towards the side of the object, a back part of negative refractive power separated from said first part by a substantial air space, said back part including a positive lens element and a negative meniscus element, said negative meniscus element being disposed closest to an image plane, and having its convex side facing an object to be photographed, said meniscus-shaped front part having a focal length of between 0.75 and the full length of the focal length of the system, the focal length of said positive element being between 0.9 and 1.5 of the focal length of the entire lens system, while the relationship of the thickness of said front part to the air space is such that the glass path for a penetrating light ray is smaller than the air path, the glass path not exceeding, however, the air path by more than 30 times, said lens including a cement layer between the lens elements of said positive front part, said cement layer having a radius length which is greater than 0.55 of the focal length of the entire system and wherein the difference in Abbé numbers between both lens elements of the front part is not greater than 20.0, said lens further including the following optical characteristics:

[Aperture relationship: 1:3.5   Focal length: 100 mm.]

| | | | |
|---|---|---|---|
| $R_1=+29.6$ | $d_1=7.5$ | $n_1=1.605602$ | $v_1=43.9$ |
| $R_2=-63.0$ | $d_2=2.0$ | $n_2=1.76182$ | $v_2=26.5$ |
| $R_3=+102.0$ | $l_1=32.3$ | | |
| $R_4=+43.0$ | $d_3=7.0$ | $n_3=1.62041$ | $v_3=60.3$ |
| $R_5=+144.0$ | $l_2=2.6$ | | |
| $R_6=-21.6$ | $d_4=1.0$ | $n_4=1.51821$ | $v_4=59.0$ |
| $R_7=-97.7$ | | | | wherein $R_1$ to $R_7$, $d_1$ to $d_4$, $l_1$ and $l_2$, $n_1$ to $n_4$, $v_1$ to $v_4$, designate, respectively, the radii, axial thicknesses, axial separations, refractive indices, and Abbé numbers of the several lens elements.

References Cited in the file of this patent
UNITED STATES PATENTS

| 560,460 | Aldis | May 19, 1896 |
| 1,485,515 | Merte | Mar. 4, 1924 |
| 2,076,190 | Wood | Apr. 6, 1937 |
| 2,559,881 | Kingslake et al. | July 10, 1951 |

FOREIGN PATENTS

| 27,518 | Great Britain | of 1912 |